US012063409B2

(12) United States Patent
Sonnleitner et al.

(10) Patent No.: US 12,063,409 B2
(45) Date of Patent: Aug. 13, 2024

(54) SYNCHRONIZED RECORDING OF AUDIO AND VIDEO WITH WIRELESSLY CONNECTED VIDEO AND AUDIO RECORDING DEVICES

(71) Applicant: Tymphany Worldwide Enterprises Limited, Grand Cayman (KY)

(72) Inventors: Philipp Sonnleitner, Gleisdorf (AT); Marc Planeck, Vienna (AT)

(73) Assignee: Tymphany Worldwide Enterprises Limited, Grand Cayman (KY)

( * ) Notice: Subject to any disclaimer, the term of this patent is extended or adjusted under 35 U.S.C. 154(b) by 823 days.

(21) Appl. No.: 16/757,724

(22) PCT Filed: Oct. 25, 2018

(86) PCT No.: PCT/EP2018/079268
§ 371 (c)(1),
(2) Date: Apr. 19, 2021

(87) PCT Pub. No.: WO2019/081633
PCT Pub. Date: May 2, 2019

(65) Prior Publication Data
US 2023/0046779 A1    Feb. 16, 2023

(30) Foreign Application Priority Data
Oct. 25, 2017 (DE) .................. 10 2017 124 984.2

(51) Int. Cl.
*H04N 21/43* (2011.01)
*G11B 27/031* (2006.01)
(Continued)

(52) U.S. Cl.
CPC ... *H04N 21/43072* (2020.08); *H04N 21/4307* (2013.01); *H04N 21/4334* (2013.01); *H04N 21/8456* (2013.01)

(58) Field of Classification Search
None
See application file for complete search history.

(56) References Cited

U.S. PATENT DOCUMENTS

2006/0104616 A1   5/2006  Shellshear
2008/0225651 A1*  9/2008  Waites .................. G11B 27/034
                                                          369/4

(Continued)

FOREIGN PATENT DOCUMENTS

WO   WO 2016/162560 A1   10/2016
WO   WO 2019/072598 A1   4/2019

OTHER PUBLICATIONS

International Search Report with Written Opinion, corresponding to PCT/EP2018/079268, dated Feb. 18, 2019, 12 pages.

(Continued)

*Primary Examiner* — Hung Q Dang
(74) *Attorney, Agent, or Firm* — Finnegan, Henderson Farabow, Garrett & Dunner, LLP

(57) ABSTRACT

A method of synchronizing video and audio when recording with a video recording device and an audio recording device configured for wireless data communication with each other including activating a recording at the video recording device, sending an audio recording command from the video recording device to the audio recording device, storing a recorded video data stream in a memory of the video recording device, receiving an audio data stream from the audio recording device at the video recording device and storing in the memory of the video recording device, determining a delay of the stored audio data stream relative to the stored video data stream, and joining the stored audio data stream and the stored video data stream together, taking the determined delay into consideration, in order to provide a recording data stream with synchronized video and audio.

13 Claims, 2 Drawing Sheets

(51) Int. Cl.
*G11B 27/10* (2006.01)
*H04N 21/433* (2011.01)
*H04N 21/845* (2011.01)

(56) References Cited

U.S. PATENT DOCUMENTS

| | | | |
|---|---|---|---|
| 2012/0033089 A1 | 2/2012 | Menke et al. | |
| 2014/0049636 A1* | 2/2014 | O'Donnell | H04N 21/21805 |
| | | | 348/143 |
| 2014/0056570 A1* | 2/2014 | Saari | H04N 5/772 |
| | | | 386/225 |
| 2014/0313275 A1* | 10/2014 | Gupta | H04N 7/141 |
| | | | 348/14.06 |
| 2017/0019580 A1* | 1/2017 | Boghosian | G11B 27/105 |
| 2018/0330760 A1* | 11/2018 | Reynolds | G11B 27/3081 |
| 2018/0350405 A1* | 12/2018 | Marco | G11B 27/031 |

OTHER PUBLICATIONS

International Search Report with Written Opinion, corresponding to PCT/EP2018/079268, dated Feb. 18, 2018, 12 pages.

* cited by examiner

SYNCHRONIZED RECORDING OF AUDIO AND VIDEO WITH WIRELESSLY CONNECTED VIDEO AND AUDIO RECORDING DEVICES

This application is a U.S. National Phase Patent Application of International Application Number PCT/EP2018/079268, filed on Oct. 25, 2018, which claims priority to German Patent Application No. DE 10 2017 124 984.2, filed on Oct. 25, 2017, the disclosure of both of which are hereby incorporated herein by reference.

TECHNICAL FIELD

Embodiments of the present invention relate to the technical field of video and audio recording, in particular recording with separate video and audio recording devices. More specifically, embodiments of the present invention relate to a method of synchronizing video and audio when recording with a video recording device and an audio recording device, which are configured to communicate wirelessly with each other. Furthermore, embodiments of the present invention relate to a system for synchronized recording of video and audio, a video recording device, as well as a computer program.

BACKGROUND

Known video recording devices with a built-in audio recording device have several drawbacks. Due to the desired compactness of such video recording devices (e.g. camcorder, smart phones and tablets), the microphone units of the built-in audio recording device are usually relatively small and can thus merely provide a correspondingly low audio recording quality. The built-in audio recording device is furthermore very susceptible to noises caused by the user (e.g. by touching the housing) or by the surroundings. Further, the use of a built-in audio recording device is not optimal in many recording situations, for example because of a relatively large and varying distance between the video recording device and the subject or object of the recording during the recording.

These drawbacks can in principle be mitigated or overcome by using a separate audio recording device of high quality, whereby, however, new challenges emerge with regard to joining video data and audio data together. The use of a cable connection between the video and audio recording devices is simple but unpractical and inflexible. A wireless connection is more practical but here difficulties emerge with regard to joining the data together in order to provide a recording data stream with synchronized video and audio. This is especially the case, when the video recording device is a mobile device with additional functions, such as e.g. a smart phone or a tablet. With such devices, in particular dependent on the current utilization of the operating system and the wireless data transmission between the audio recording device and the video recording device, significantly fluctuating delays may occur between the point in time, at which a recording is activated (e.g. by operating a recording button), and the points in time, at which the video recording and the audio recording actually begin and are stored.

SUMMARY

There may be a need for efficient synchronization of video and audio when recording with a video recording device and an audio recording device, which are configured to communicate wirelessly with each other.

This need may be met by the exemplary embodiments set forth in the independent claims. Further advantageous exemplary embodiments of the present invention are set forth in the dependent claims.

According to a first aspect, a method of synchronizing video and data when recording with a video recording device and an audio recording device, which are configured for wireless data communication with each other, is described. The described method comprises the following: (a) activating a recording at the video recording device, (b) sending an audio recording command from the video recording device to the audio recording device, (c) storing a recorded video data stream in a memory of the video recording device, (d) receiving an audio data stream from the audio recording device at the video recording device and storing the same in the memory of the video recording device, (e) determining a delay of the stored audio data stream relative to the stored video data stream, and (f) joining the stored audio data stream and the stored video data stream together, taking the determined delay into consideration, in order to provide a recording data stream with synchronized video and audio.

According to this aspect, a recording is at first activated at the video recording device, for example by pressing a start button or the like. In response to this activation, the video recording device sends an audio recording command to the audio recording device in order to initiate an audio recording by the audio recording device. As a further response to the activation of the recording, video is recorded, and the recorded video data stream is stored in a memory of the video recording device. Furthermore, the audio recorded by the audio recording device is sent to the video recording device. The video recording device receives the corresponding audio data stream and stores it in the memory. Then, a delay (or a time offset) of the stored audio data stream relative to the stored video data stream is determined, and the audio data stream is joined with the video data stream, while taking the determined delay into consideration, in order to provide a finished recording data stream with synchronized video and audio, i.e. a recording data stream, in which video and audio are temporally synced (in sync). The delay or time offset may be both negative and positive. The sign depends on whether the audio data stream is early or late relative to the video data stream.

According to an exemplary embodiment, the determination of the delay comprises the following: (a) determining a video recording starting point in time, at which the first video data in the video data stream is recorded by the video recording device, (b) determining an audio recording starting point in time, at which the first audio data in the audio data stream is recorded by the audio recording device, and (c) determining the delay of the stored audio data stream relative to the stored video data stream based on the video recording starting point in time and the audio recording starting point in time.

In other words, the points in time are determined, at which respectively the audio recording and the video recording actually begin, and the delay is determined based on these points in time, for example as a difference between the points in time.

According to a further exemplary embodiment, the video recording starting point in time and the audio recording starting point in time are determined relative to the point in time where the recording is activated at the video recording device.

In other words, the point in time where the recording is activated is used as a reference point in time for the video recording starting point in time and the audio recording starting point in time.

According to a further exemplary embodiment, the audio recording command comprises a first time stamp, and the first audio data in the audio data stream comprises a second time stamp.

In other words, the first time stamp corresponds to the point in time, at which the audio recording command is sent, and the second time stamp corresponds to the point in time, at which the first audio data is recorded.

According to a further exemplary embodiment, the second time stamp is determined relative to the first time stamp and taking a processing time of the audio recording device into consideration.

By determining the second time stamp relative to the first time stamp and by taking the processing time of the audio recording device, i.e. the period of time from receiving the audio recording command at the audio recording device and until recording of the first audio data, into consideration, it is now possible to determine, or at least to estimate with high precision, the audio recording starting point in time relative to the point in time, at which the recording was activated, in a simple manner.

According to a further exemplary embodiment, the audio recording starting point in time is determined based on the first and second time stamps and based on a transmission delay associated with the wireless data communication.

In this exemplary embodiment, also the data transmission delay is taken into consideration in order to obtain an even better precision in the determination of the audio recording starting point in time.

According to a further exemplary embodiment, the video recording starting point in time is determined by measuring the distance in time between the activation of the recording and the storing of the first video data of the recorded video data stream in the memory of the video recording device.

The measurement of the distance in time may in particular be carried out by means of a counter. In other words, the distance in time between the activation of the recording and the actual video recording starting point in time is determined.

According to a further exemplary embodiment, the method further comprises cutting the recording data stream, wherein audio data, for which no corresponding video data is available, and video data, for which no corresponding audio data is available, are removed.

In this exemplary embodiment, sections are removed at the beginning or at the end of the recording data stream, in which audio data or video data is missing. Thus, the cut recording data stream comprises both audio data and video data throughout, and these are perfectly synchronized.

According to a further exemplary embodiment, the method further comprises the following: (a) sending a further audio recording command from the video recording device to a further audio recording device, (b) receiving a further audio data stream from the further audio recording device at the video recording device and storing the same in the memory of the video recording device, (c) determining a further delay of the stored further audio data stream relative to the stored video data stream, and (d) joining the stored further audio data stream, the stored audio data stream, and the stored video data stream together, taking the determined further delay and the determined delay into consideration.

In other words, the video recording device communicates with a further audio recording device in the same manner as it communicates with the audio recording device. Thus, two audio data streams (audio tracks) can be recorded by two separate audio recording devices at the same time and joined together with the video data stream, so that a recording data stream with synchronized video and audio is provided. The use of two (or more) audio recording devices provides for a further improved audio quality when the individual audio recording devices are arranged at selected positions and/or with selected orientations.

According to a second aspect, a system for synchronized recording of video and audio is described. The described system comprises (a) a video recording device, and (b) an audio recording device, wherein the video recording device and the audio recording device are configured for wireless data communication with each other and for performing the method according to the first aspect or any one of the exemplary embodiments described above.

In other words, this aspect relates to a system comprising a video recording device and an audio recording device, which are configured to perform the method according to the first aspect.

According to an exemplary embodiment, the video recording device is a mobile data communication device, in particular a smart phone or a tablet, with a built-in camera.

According to a further exemplary embodiment, the system further comprises a further audio recording device, which is configured for wireless communication with the video recording device.

With this system, two (or more) audio data streams (audio tracks) from two separate audio recording devices can be recorded at the same time and joined together with the video data stream, so that a recording data stream with synchronized video and audio is provided. The use of two (or more) audio recording devices provides for a further improved audio quality when the individual audio recording devices are arranged at selected positions and/or with selected orientations.

According to a third aspect, a video recording device is described, the video recording device comprising (a) a data communication unit which is configured for wireless data communication with an audio recording device, (b) a memory, and (c) a control unit, which is configured to (d) send an audio recording command to the audio recording device by means of the data communication unit, (e) store a recorded video data stream in the memory, (f) receive an audio data stream from the audio recording device by means of the data communication unit, (g) store the received audio data stream in the memory, (h) determine a delay of the stored audio data stream relative to the stored video data stream, and (i) join the stored audio data stream and the stored video data stream together, taking the determined delay into consideration, in order to provide a recording data stream with synchronized video and audio.

In other words, the video recording device according to this aspect is configured to perform the method according to the first aspect by communicating with a suitable audio recording device by means of wireless data communication, such as Bluetooth.

According to an exemplary embodiment, the data communication unit is further configured for wireless data communication with a further audio recording device, and the control unit is further configured to: (a) send a further audio recording command from the video recording device to the further audio recording device by means of the data communication unit, (b) receive a further audio data stream from the further audio recording device by means of the data communication unit, (c) store the received further audio data stream in the memory, (d) determine a further delay of the stored further audio data stream relative to the stored video data stream, and (e) join the stored further audio data stream, the stored audio data stream, and the stored video data stream together, taking the determined further delay and the determined delay into consideration.

In other words, two (or more) audio data streams (audio tracks) from two separate audio recording devices can be recorded at the same time and joined together with the video data stream, so that a recording data stream with synchronized video and audio is provided. The use of two (or more) audio recording devices provides for a further improved audio quality when the individual audio recording devices are arranged at selected positions and/or with selected orientations.

According to a fourth aspect, a computer program is described, which, when it is executed by a processor, is configured to perform the method according to the first aspect and/or one of the exemplary embodiments described above.

The computer program may in particular be an app for a smart phone or tablet.

For the purposes of this document, the mentioning of such a computer program is equivalent to the notion of a program element, a computer program product and/or a computer readable medium comprising instructions for controlling a computer system in order to coordinate the functioning of a system or a method in a suitable manner, in order to obtain the effects associated with the method according to the present invention.

The computer program may be implemented as computer readable instruction code in any suitable programming language, such as for example JAVA, C++, etc. The computer program may be stored on a computer readable storage medium (CD-ROM, DVD, Blu-ray Disc, removable drive, volatile or non-volatile memory, built-in memory/processor etc.). The instruction code may program a computer or other programmable devices in such a way that the desired functions are performed. Furthermore, the computer program may be provided in a network, such as for example the Internet, from which it can be downloaded by a user on demand.

Exemplary embodiments may both be realized by means of a computer program, i.e. a software, as well as by means of one or more special electronic circuits, i.e. in hardware, or in any arbitrary hybrid form, i.e. by means of software components and hardware components.

It is pointed out that exemplary embodiments have been described with reference to different subject matters. In particular, some exemplary embodiments are described with method claims and other exemplary embodiments are described with device claims. However, it will be immediately clear to a skilled person reading this application that, unless explicitly otherwise indicated, in addition to a combination of features belonging to one type of subject matter, also any arbitrary combination of features that belong to different types of subject matters is possible.

Further advantages and features will become apparent from the following exemplary description of a preferred embodiment.

DETAILED DESCRIPTION OF EXEMPLARY EMBODIMENTS

Figure 1:
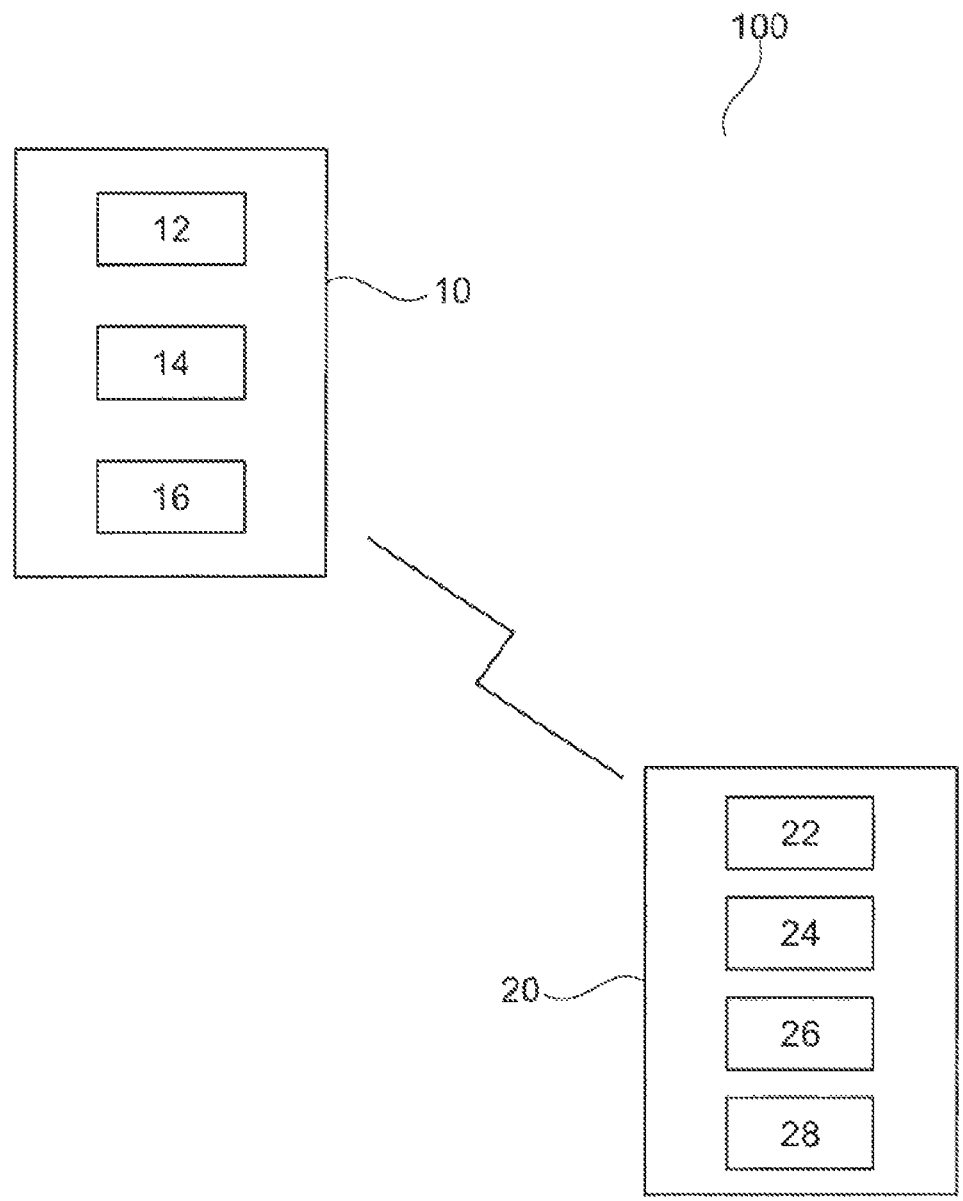
FIG. 1 shows a system for synchronized recording of video and audio in accordance with an exemplary embodiment.

FIG. 1 shows a system 100 for synchronized recording of video and audio in accordance with an exemplary embodiment. The system 100 comprises an audio recording device 10 and a video recording device 20. The audio recording device 10 comprises a microphone 12, a processor 14, and a wireless data communication unit 16, in particular a Bluetooth data communication unit or a WLAN data communication unit. The video recording device 20 comprises a wireless data communication unit 22, in particular a Bluetooth data communication unit, a memory 24, a processor or control unit 26, and a camera 28. The video recording device may in particular be a smart phone or a tablet. The audio recording device 10 and the video recording device 20 can communicate wirelessly with each other by means of the respective data communication units 16 and 22. The functionality of the system 100 will now be described in more detail in the framework of a method.

Figure 2:
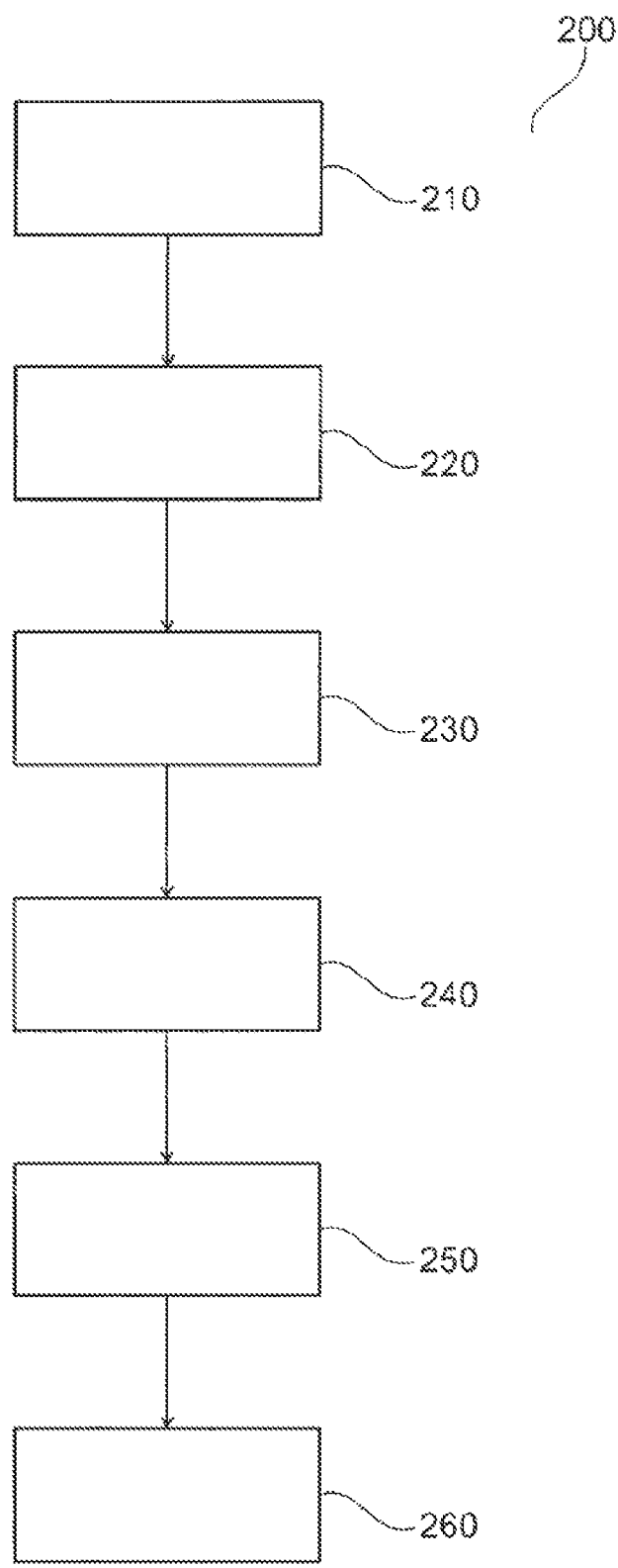
FIG. 2 shows a flow diagram of a method of synchronizing video and audio when recording with a video recording device and an audio recording device in accordance with an exemplary embodiment.

FIG. 2 shows a flow diagram of a method 200 of synchronizing video and audio in accordance with an exemplary embodiment when recording with the system 100 shown in FIG. 1, which as described above comprises a video recording device 20 and an audio recording device 10, which are configured for wireless data communication with each other.

The method begins at 210 where a user activates a recording by operating the video recording device 20. If the video recording device 20 is a smart phone or a tablet, this may for example be done by pushing an activation button on the display. In response to the activation at 210, the video recording device 20 sends, at 220, within a short period of time, an audio recording command to the audio recording device 10 by means of the wireless communication connection. As a further response to the activation at 210, the video recording device 20 also activates a video recording by means of the camera 28 and stores, at 230, the recorded video data stream in its memory 24. At 240, the video recording device 20 receives an audio data stream from the audio recording device 10 and also stores this in its memory 24. At 250, a delay or a time offset between the audio data stream and the video data stream is then determined. At 260, the audio data stream and the video data stream are joined together, while taking the delay which was determined at 250 into consideration, in order to provide a recording data stream with synchronized video and audio.

The determination of the delay may in particular be done as follows: (i) determine a video recording starting point in time, at which the first video data in the video data stream is recorded by the video recording device 20, (ii) determine an audio recording starting point in time, at which the first audio data in the audio data stream is recorded by the audio recording device 10, and (iii) determine the delay of the stored audio data stream relative to the stored video data stream based on the video recording starting point in time and the audio recording starting point in time, in particular as a difference between the video recording starting point in time and the audio recording starting point in time.

Both the video recording starting point in time and the audio recording starting point in time are preferably determined relative to the point in time, at which the recording is activated 210.

The audio recording command at 220 preferably comprises a first time stamp, and the first audio data in the audio data stream preferably comprises a second time stamp. The second time stamp may in particular be determined relative to the first time stamp and taking a processing time of the audio recording device 10 into consideration. Furthermore, the audio recording starting point in time may be determined based on the first and second time stamps as well as based on a transmission delay associated with the wireless data communication.

The video recording starting point in time is preferably determined by measuring the distance in time between the activation 210 of the recording and the storing of the first video data of the recorded video data stream in the memory 24 of the video recording device 20.

The resulting recording data stream may optionally be cut, whereby audio data, for which no corresponding video data is available, and video data, for which no corresponding audio data is available, are removed.

The system described above and the corresponding method can be extended by one or more additional audio recording devices 10, so that the audio data stream from each individual audio recording device 10 is joined with the video data stream in the manner described above.

The invention claimed is:

1. A method of synchronizing video and data when recording with a video recording device and an audio recording device, which are configured for wireless data communication with each other, the method comprising:
activating a recording at the video recording device,
sending an audio recording command from the video recording device to the audio recording device,
storing a video data stream in a memory of the video recording device,
receiving an audio data stream from the audio recording device at the video recording device and storing the same in the memory of the video recording device,
determining a delay of the stored audio data stream relative to the stored video data stream at time T1 at a control unit of the video recording device, wherein the time T1 is after both the step of storing the video data stream and the step of storing the audio data stream at the memory of the video recording device, and
joining the stored audio data stream and the stored video data stream together, taking the determined delay into consideration, in order to provide a recording data stream with synchronized video and audio at the control unit of the video recording device, wherein the determining the delay comprises:
determining a video recording starting point in time, the time T2, at which the first video data in the stored video data stream is initially recorded by the video recording device,
determining an audio recording starting point in time, the time T3, at which the first audio data in the audio data stream is initially recorded by the audio recording device before being sent to the video recording device, wherein the audio recording command comprises a first time stamp, and the first audio data in the audio data stream comprises a second time stamp, the first time stamp corresponds to the point in time, at which the audio recording command is sent out, and the second time stamp corresponds to the point in time, at which the first audio data is recorded at the audio recording device, and the audio recording starting point in time, the time T3, is determined based on the first and second time stamps and based on a transmission delay associated with the wireless data communication, and
determining the delay of the stored audio data stream relative to the stored video data stream based on the video recording starting point in time, the time T2, and the audio recording starting point in time, the time T3.

2. The method according to claim 1, wherein the video recording starting point in time and the audio recording starting point in time are determined relative to the point in time where the recording is activated at the video recording device.

3. The method according to claim 1, wherein the audio recording command comprises a first time stamp, and wherein the first audio data in the audio data stream comprises a second time stamp.

4. The method according to claim 3, wherein the second time stamp is determined relative to the first time stamp and taking a processing time of the audio recording device into consideration.

5. The method according to claim 3, wherein the audio recording starting point in time is determined based on the first and second time stamps and based on a transmission delay associated with the wireless data communication.

6. The method according to claim 1, wherein the video recording starting point in time is determined by measuring a difference in time between the activation of the recording and the storing of the first video data of the stored video data stream in the memory of the video recording device.

7. The method according to claim 1, further comprising a cutting of the recording data stream, wherein audio data, for which no corresponding video data is available, and video data, for which no corresponding audio data is available, are removed.

8. The method according to claim 1, further comprising
sending a further audio recording command from the video recording device to a further audio recording device,
receiving a further audio data stream from the further audio recording device at the video recording device and storing the same in the memory of the video recording device,
determining a further delay of the stored further audio data stream relative to the stored video data stream, and
joining the stored further audio data stream, the stored audio data stream, and the stored video data stream together, taking the determined further delay and the determined delay into consideration.

9. A system for synchronized recording of video and audio, the system comprising:
a video recording device, and
an audio recording device, wherein the video recording device and the audio recording device are configured for wireless data communication with each other and to:
activate a recording at the video recording device,
send an audio recording command from the video recording device to the audio recording device,
store a video data stream in a memory of the video recording device,
receive an audio data stream from the audio recording device at the video recording device and storing the same in the memory of the video recording device,
determine a delay of the stored audio data stream relative to the stored video data stream at time T1 at a control unit of the video recording device, wherein the time T1 is after both the step of storing the video data stream and the step of storing the audio data stream at the memory of the video recording device, and join the stored audio data stream and the stored video data stream together, taking the determined delay into consideration, in order to provide a recording data stream with synchronized video and audio at the control unit of the video recording device, wherein the determining the delay comprises:

determining a video recording starting point in time, the time T2, at which the first video data in the stored video data stream is initially recorded by the video recording device, determining an audio recording starting point in time, the time T3, at which the first audio data in the audio data stream is initially recorded by the audio recording device before being sent to the video recording device, wherein the audio recording command comprises a first time stamp, and the first audio data in the audio data stream comprises a second time stamp, the first time stamp corresponds to the point in time, at which the audio recording command is sent out, and the second time stamp corresponds to the point in time, at which the first audio data is recorded at the audio recording device, and the audio recording starting point in time, the time T3, is determined based on the first and second time stamps and based on a transmission delay associated with the wireless data communication, and determining the delay of the stored audio data stream relative to the stored video data stream based on the video recording starting point in time, the time T2 and the audio recording starting point in time, the time T3.

10. The system according to claim 9, wherein the video recording device is a mobile data communication device with a built-in camera.

11. The system according to claim 9, further comprising a further audio recording device, which is configured for wireless communication with the video recording device.

12. A video recording device, comprising:
a data communication unit which is configured for wireless data communication with an audio recording device,
a memory, and
a control unit, which is configured to:
send an audio recording command to the audio recording device by means of the data communication unit,
store a video data stream in the memory,
receive an audio data stream from the audio recording device by means of the data communication unit,
store the received audio data stream in the memory,
determine a delay of the stored audio data stream relative to the stored video data stream at time T1 at a control unit of the video recording device, wherein the time T1 is after both the step of storing the video data stream and the step of storing the audio data stream at the memory of the video recording device, and join the stored audio data stream and the stored video data stream together, taking the determined delay into consideration, in order to provide a recording data stream with synchronized video and audio at the control unit of the video recording device, wherein the determining the delay comprises:

determining a video recording starting point in time, the time T2, at which the first video data in the stored video data stream is initially recorded and by the video recording device, determining an audio recording starting point in time, the time T3, at which the first audio data in the audio data stream is initially recorded by the audio recording device before being sent to the video recording device, wherein the audio recording command comprises a first time stamp, and the first audio data in the audio data stream comprises a second time stamp, the first time stamp corresponds to the point in time, at which the audio recording command is sent out, and the second time stamp corresponds to the point in time, at which the first audio data is recorded at the audio recording device, and the audio recording starting point in time, the time T3, is determined based on the first and second time stamps and based on a transmission delay associated with the wireless data communication, and determining the delay of the stored audio data stream relative to the stored video data stream based on the video recording starting point in time, the time T2, and the audio recording starting point in time, the time T3.

13. The video recording device according to claim 12, wherein the data communication unit is further configured for wireless data communication with a further audio recording device, and wherein the control unit is further configured to:
send a further audio recording command from the video recording device to the further audio recording device by means of the data communication unit,
receive a further audio data stream from the further audio recording device by means of the data communication unit,
store the received further audio data stream in the memory,
determine a further delay of the stored further audio data stream relative to the stored video data stream, and
join the stored further audio data stream, the stored audio data stream, and the stored video data stream together, taking the determined further delay and the determined delay into consideration.

* * * * *